United States Patent Office 3,548,016
Patented Dec. 15, 1970

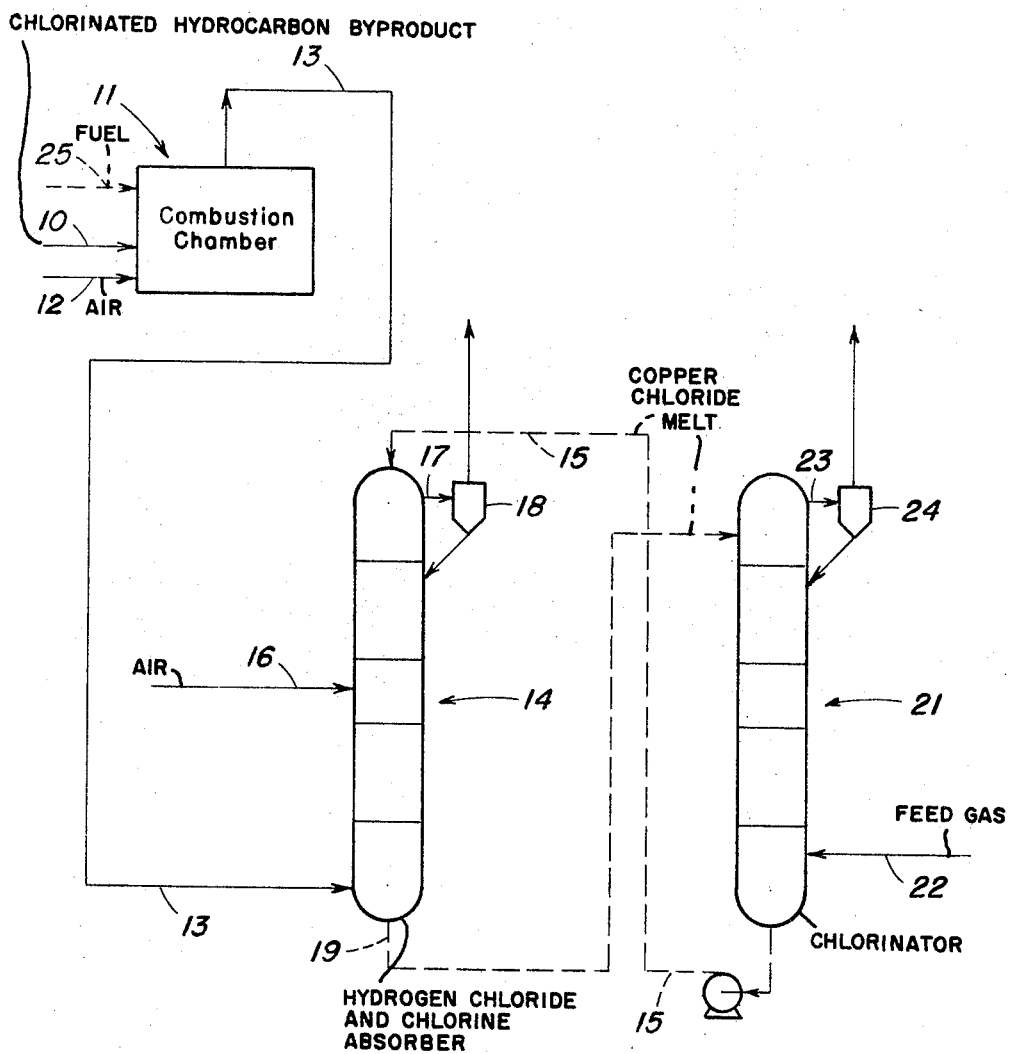

3,548,016
CHLORINE VALUES RECOVERY AND USE
Morgan C. Sze, Garden City, N.Y., assignor to The Lummus Company, New York, N.Y., a corporation of Delaware
Filed Apr. 11, 1967, Ser. No. 630,079
Int. Cl. C01b 7/02, 7/08; C01g 3/00; C07c 17/06
U.S. Cl. 260—659                                   6 Claims

ABSTRACT OF THE DISCLOSURE

A process for recovering chlorine values from a chlorinated hydrocarbon wherein the chlorinated hydrocarbon is burned at an elevated temperature to produce a gaseous effluent, containing chlorine and some hydrogen chloride. The gaseous effluent is contacted with a molten salt mixture containing cuprous chloride and copper oxychloride, at a temperature between 600° and 1200° F. whereby the hydrogen chloride reacts with the copper oxychloride and the chlorine reacts with the cuprous chloride producing cupric chloride. The molten salt mixture, now rich in cupric chloride, is contacted with a feed, containing a hydrocarbon and/or a chlorinated hydrocarbon at a temperature above 600° F. converting the cupric chloride to cuprous chloride while simultaneously effecting chlorination, dehydrogenation and dehydrochlorination of the feed. The cupric chloride forming and decomposition reactions may be operated such that substantially all the heat absorbed by the melt in the former reaction is absorbed in the latter reaction.

---

This invention relates to the recovery of halogen, and more particularly to the recovery of halogen values from halogenated hydrocarbons. Still more particularly, this invention relates to the recovery of chlorine from chlorinated hydrocarbons.

In chlorination processes, for example, the chlorination of hydrocarbons, chlorinated hydrocarbons other than the one desired are produced, some of which are unmarketable. For example, in the production of vinyl chloride, by-products, including, 1,1-dichloroethylene, cis and trans-1,2-dichloroethylene, trichloroethylene, tetrachloroethylene, trichloroethane, and perchloroethylene, are produced. If such by-products cannot be used or sold, they represent a chlorine loss which significantly raises the cost of the overall process.

Accordingly, an object of this invention is to recover halogen values from halogenated hydrocarbons.

Another object of this invention is to provide a process for continuously recovering chlorine from chlorinated hydrocarbons.

A further object of this invention is to use the recovered chlorine for the chlorination of a hydrocarbon.

These and other objects of this invention will become more fully apparent from the following detailed description of the invention when read with reference to the accompanying drawing wherein:

The drawing is a schematic flow diagram of an embodiment of the process of the invention.

The objects of the invention are broadly accomplished by burning a halogenated hydrocarbon to produce an effluent, containing the corresponding halogen and hydrogen halide, contacting the effluent with a salt mixture having an affinity for the halogen and hydrogen halide to recover halogen values and contacting the salt mixture with a hydrocarbon and/or a chlorinated hydrocarbon to recover the accumulated halogen values from the salt mixture. The invention is particularly applicable to the recovery of chlorine values from chlorinated hydrocarbons, as hereinafter described, but it is to be understood that the process of the invention is equally applicable to recovering other halogen values, such as bromine, from other halogenated hydrocarbons.

More particularly, a chlorinated hydrocarbon, either a chlorinated aliphatic or aromatic hydrocarbon or mixtures thereof, including 1,1-dichloroethylene, cis or trans-1,2-dichloroethylene, trichloroethylene, tetrachloroethylene, trichloroethane, perchloroethylene and the like, may be burned to produce a combustion effluent, containing chlorine and hydrogen chloride, in addition to water, carbon dioxide, carbon monoxide and nitrogen. The combustion may be effected over a wide range of conditions, generally at temperatures between about 1000° F. and about 3000° F. and pressures between about 1 and about 30 atmospheres, and preferably under conditions favoring the production of chlorine in contradistinction to hydrogen chloride, i.e., lower temperatures, for example, temperatures between about 1000° F. and about 2000° F. Consequently, in accordance with the preferred procedure of the invention, the combustion effluent primarily contains chlorine and only some hydrogen chloride. It is to be understood, however, that within the scope of the invention, the combustion of the chlorinated hydrocarbon may be effected under conditions such that either chlorine or hydrogen chloride is produced to the virtual exclusion of the other.

The combustion is effected by contacting the chlorinated hydrocarbon with a gas containing free-oxygen, e.g., air, with the gas generally containing sufficient oxygen to supply at least about one mole of oxygen per atom of carbon and one quarter-mole per atom of hydrogen. In some cases, in order to maintain the desired combustion conditions, fuel is added to the combustion feed and in such cases sufficient oxygen must be present to meet the oxygen requirements for the fuel.

It should be readily apparent that the above conditions are only illustrative and that optimum conditions will vary for each chlorinated hydrocarbon. The choice of such conditions are deemed to be within the scope of those skilled in the art from the teachings herein.

The chlorine and hydrogen chloride are recovered from the combustion effluent by reaction with a salt mixture containing a chloride and an oxychloride of a multivalent metal, i.e., a metal having more than one valence state. More particularly, the combustion effluent is contacted with either a solid or liquid salt mixture, containing cuprous chloride and copper oxychloride under conditions such that the chlorine reacts with the cuprous chloride and the hydrogen chloride reacts with the copper oxychloride to produce cupric chloride. The copper oxychloride may be produced under the process conditions by reacting cuprous chloride with air or oxygen, i.e., the cuprous chloride is contacted by both, air or oxygen and the combustion effluent. The oxygen may be supplied either from an external source or may be introduced with the combustion effluent by adding to the feed to the combustion reaction an excess of oxygen sufficient to form either all or part of the required copper oxychloride. The reactions may be represented by the following equations:

(1)   $2HCl + CuO \cdot CuCl_2 \rightarrow 2CuCl_2 + H_2O$
(2)   $Cl_2 + 2CuCl \rightarrow 2CuCl_2$
(3)   $2CuCl + \tfrac{1}{2}O_2 \rightarrow CuO \cdot CuCl_2$ The overall reaction for converting hydrogen chloride to cupric chloride, combining Equations 1 and 3 may be represented by the following Equation 4:

(4)   $4HCl + 4CuCl + O_2 \rightarrow 4CuCl_2 + 2H_2O$

The recovery of chlorine values, i.e., chlorine and hydrogen chloride, from the combustion effluent is effected at a temperature above about 600° F. and generally at a temperature between about 600° F. and about 1200° F., a pressure between about 1 and about 30 atmospheres and a residence time between about 1 and about 60 seconds. The recovery may be effected at slightly lower temperatures, with a decreased reaction rate. Temperatures above about 1200° F. are generally not employed, since at such temperatures, oxygen absorption by the salt mixture is poor and cupric chloride decomposes excessively to produce chlorine. The total amount of oxygen introduced into the chlorine recovery zone is dependent upon the oxygen absorption efficiency of the salt mixture and is generally introduced in an amount such that the amount of copper oxychloride produced is not much greater than the amount stoichiometrically required to convert all of the hydrogen chloride present in the combustion effluent to cupric chloride, as represented by Equations 1 and 3. The cuprous chloride is generally employed in a stoichiometric excess, especially when employing copper chloride melts, as hereinafter more fully described.

The cupric chloride formed in the recovery of chlorine values, i.e., chlorine and hydrogen chloride, from the combustion effluent may then be employed to effect chlorination and dehydrogenation of a feed containing either a hydrocarbon, a chlorinated hydrocarbon or a mixture thereof. The hydrocarbons and chlorinated hydrocarbons may be either aliphatic, including both saturated and unsaturated aliphatic compounds, or aromatic compounds and the reactions may be represented by the following equations, using ethane and ethyl chloride as representative examples:

(5)     $C_2H_6 + 2CuCl_2 \rightarrow C_2H_5Cl + HCl + 2CuCl$ (6)     $C_2H_6 + 4CuCl_2 \rightarrow C_2H_3Cl + 3HCl + 4CuCl$ (7)     $C_2H_6 + 2CuCl_2 \rightarrow C_2H_4 + 2HCl + 2CuCl$ (8)     $C_2H_3Cl + 2CuCl_2 \rightarrow C_2H_3Cl + 2HCl + 2CuCl$ The cupric chloride is contacted with the feed stream, containing either a chlorinated hydrocarbon, a hydrocarbon or a mixture thereof, under conditions which effect reaction between the cupric chloride and feed stream, resulting in reduction of the cupric chloride to cuprous chloride, chlorination and dehydrogenation of the feed stream, e.g., temperatures above about 600° F., pressures between about 1 and about 30 atmospheres and residence times between about 1 and about 60 seconds. Under the hereinabove described conditions, dehydrochlorination is also effected which is represented by the following equation, using ethyl chloride as a representative example:

(9)     $C_2H_5Cl \rightarrow C_2H_4 + HCl$

The exact temperature, pressure and residence time employed will vary with the particular feed, and optimum conditions for any feed may be readily determined by those skilled in the art from the overall teachings of the invention.

It is to be understood that the hereinabove described equations and reactions are not intended to limit the invention in any manner and are only illustrative of the process of the invention. It is also to be understood that the relative rates of chlorination, dehydrogenation and dehydrochlorination vary with the particular feed and reaction conditions and consequently, within the scope of the invention such conditions may be varied to favor any one or more of the above reactions to the substantial exclusion of another.

In a preferred embodiment of the process of the invention, a mixture of copper chlorides is employed as a melt to continuously recover chlorine. A mixture of copper chlorides, however, has a high melting point, and in general, a chloride of a univalent metal, i.e., a metal having only one valence state, which is non-volatile and resistant to the action of oxygen under process conditions is added to the mixture of copper chlorides to reduce the overall melting point of the mixture. The metal chlorides which are preferably employed to reduce the melting point of the mixture are the alkali metal chlorides, and potassium chloride in particular. It is to be understood, however, that other metal chlorides, such as the heavy metal chlorides, e.g., zinc, silver and thallium chlorides, and mixtures of metal chlorides, may also be employed. The univalent metal chlorides are generally added to the copper chloride melt in an amount sufficient to adjust the melting point of the molten salt mixture to a temperature of about 500° F., e.g., by adding between about 20 and about 40 weight percent of potassium chloride to a mixture of copper chlorides. It is to be understood, however, that in some cases, the catalyst salt mixture may have a melting point higher than 500° F., provided that the salt mixture remains in the form of a melt throughout the process. It is also to be understood that the solubility of copper oxychloride in the melt is limited and accordingly, the total amount of copper oxychloride which may be present in the salt mixture is also limited.

As a distinct feature of this invetnion, the chlorine recovery and subsequent simultaneous chlorination, dehydrogenation and dehydrochlorination, are effected continuously by circulating the copper chloride melt between two reaction zones under conditions such that there is a heat balance between the cupric chloride forming reactions in the chlorine recovery reaction zone and the cupric chloride consuming reactions in the chlorination zone. Thus, the copper chloride forming reaction is exothermic and the chlorination, dehydrogenation and dehydrochlorination reactions are endothermic and consequently, the two reaction zones may be balanced so that substantially all of the heat accumulated by the melt in the exothermic reaction is extracted therefrom during the endothermic reactions thereby eliminating the necessity for separate equipment for effecting heat recovery by indirect heat transfer. Thus, the temperature of the feed to the copper chloride consumption reaction zone is selected so that substantially all of the heat required to effect the simultaneous chlorination, dehydrogenation and dehydrochlorination of the feed is supplied by the exothermic heat of reaction for producing cupric chloride. Accordingly, the amount of heat generated in the exothermic production of cupric chloride determines both the temperature and the amount of feed and recycle introduced into the cupric chloride consumption reaction zone, with the temperatures of the feed being indirectly proportional to the amount of heat generated in the production of cupric chloride. It should also be readily apparent from the above that the conversion of cuprous chloride to both copper oxychloride and cupric chloride in the chlorine recovery zone must also be controlled in order to avoid excessive heat accumulation by the melt.

The invention will now be described with reference to a preferred embodiment wherein copper chloride melts are employed to effect the process of the invention continuously, using the conditions hereinabove described. Although the invention is particularly described with reference to using cupric chloride as a chlorinating agent for producing chlorinated hydrocarbons, it is to be understood that the embodiment is equally applicable to recovery of chlorine directly from cupric chloride. It is further to be understood that equipments such as pumps, valves, etc., have been omitted from the drawing to simplify the description thereof, and the use of such equipment in appropriate places is well within the scope of those skilled in the art from the description of the invention.

Referring to the drawing, a chlorinated hydrocarbon, such as 1,2-dichloroethylene, in line 10 is introduced into a combustion chamber, schematically indicated as 11, and mixed therein with an oxygen containing gas, such as air, introduced through line 12. Auxiliary fuel, if needed, may be added to the combustion chamber 11 through line 25. Combustion of the chlorinated hydrocarbon is effected in combustion chamber 11 under temperature and pressure conditions such that the chlorine values thereof are primarily recovered as free chlorine.

A gaseous effluent containing primarily chlorine, carbon dioxide, water and nitrogen with small amounts of hydrogen chloride and carbon monoxide is withdrawn from combustion chamber 11 through line 13 and introduced into the bottom of a tower 14 containing packing or other equivalent contacting devices. A melt primarily containing cuprous chloride and including cupric chloride and potassium chloride is introduced into the top of the tower 14 through line 15. An oxygen containing gas, such as air, is introduced into an intermediate point of the tower 14 through line 16. The melt descending in tower 14 is countercurrently contacted first with the oxygen-containing gas, and then with the combustion effluent containing chlorine and some hydrogen chloride. As a result of such contact, the hydrogen chloride, oxygen and chlorine react with the cuprous chloride converting a major portion thereof to cupric chloride. A gaseous stream, primarily containing carbon dioxide, carbon monoxide, nitrogen and water vapor, is withdrawn from tower 14 through line 17, provided with a separator 18 to eliminate entrained melt, and treated to remove any objectionable components (not shown), as known in the art, prior to being discarded.

A hot melt, rich in cupric chloride (the temperature of the melt is below the temperature, for the process pressure, at which decomposition of cupric chloride is appreciable), is withdrawn from tower 14 through line 19 and introduced into the top of a tower 21, containing packing or other equivalent contacting devices. A feed stream, containing a hydrocarbon, a chlorinated hydrocarbon, or a mixture thereof, such as ethane, ethylene or ethyl chloride, either in gaseous and/or liquid form, is introduced into the bottom of the tower 21 through line 22. The melt, rich in cupric chloride, descending in the tower 21 is countercurrently contacted by the feed, resulting in chlorination and dehydrogenation of the feed, conversion of cupric chloride to cuprous chloride and concurrent cooling of the melt, as hereinabove more fully described. In addition, dehydrochlorination of chlorinated hydrocarbons is effected in tower 21. A cooled melt, primarily containing cuprous chloride, is withdrawn from the tower 21 through line 15 for recirculation to the tower 14.

An effluent, containing hydrocarbons and chlorinated hydrocarbons, is withdrawn from the tower 21 through line 23, containing a separator 24 to remove entrained salts and passed to a separation section (not shown) wherein products are removed and unconverted feed and by-products may be recycled to the tower 21.

Numerous modifications in the above-described process are possible without departing from the scope of the invention. Thus, the mixture of copper chlorides, with or without other metal chlorides, may be impregnated on a suitable carrier, e.g., silica gel, instead of being used in the form of a melt. As other alternatives, the copper oxychloride may be produced separately instead of being simultaneously produced during the chlorine recovery step. As a further alternative, tower 21 may be at a lower pressure than tower 14 to improve chlorine transfer reactions. As another alternative, the feed and melt may be passed cocurrently to each other instead of countercurrently.

As still another modification, the upper sections of towers 14 and 21 may be provided with a quench zone wherein the effluent stream withdrawn from the packed section is contacted with a quench liquor to cool the effluent to a temperature above the dew temperature of the combined effluent-quench liquor streams, resulting in elimination of any entrained and/or vaporized salt from the effluent stream and vaporization of the quench liquor. The combined effluent-quench liquor stream is withdrawn from the quench zone, and cooled to condense the quench liquor which is recovered and recycled to the towers.

As yet another modification, a direct heat exchanger for the molten salt may be provided between towers 14 and 21 wherein the molten salt may be directly contacted with either a hot or cold inert gas stream to independently raise or lower the salt temperature as necessary.

As still a further modification, the cupric chloride melt withdrawn from the chlorine recovery zone may be heated to a temperature above the decomposition temperature of the cupric chloride to directly recover chlorine, as represented by the following equation:

(10) $\quad 2CuCl_2 \rightarrow 2CuCl + Cl_2(g)$

These and other modifications should be apparent to those skilled in the art from the description of the invention.

The following table is illustrative of conditions employed in operating in accordance with the process of the invention but the scope of the invention is not limited thereby.

The feed to the tower 14 is obtained by burning 2430 pounds per hour of cis 1,2-dichloroethylene at a temperature of between 1400° and 1800° F., and a pressure of 165 p.s.i.g.

TABLE

| Stream | 13 | 16 | 15 | 19 | 22 | 23 | 17 |
|---|---|---|---|---|---|---|---|
| Temperature, °F | 1,400 | 100 | 750 | 900 | 100 | *300 | *300 |
| Pressure, p.s.i.g | 160 | 155 | 160 | 160 | 160 | 150 | 150 |
| Flow lbs./hr | 11,495 | 334 | 90,000 | 91,700 | 3,575 | 5,276 | 10,129 |
| Components | Mole/hr. | Mole/hr. | Mole/hr. | Mole/hr. | Mole/hr. | Mole/hr. | Mole/hr. |
| $Cl_2$ | 22.5 | | | | | | 0.8 |
| HCl | 5 | | | | | 42.3 | 0.6 |
| $O_2$ | | 2.5 | | | | | 1.4 |
| $N_2$ | 248 | 9 | | | | | 257 |
| $H_2O$ | 26.5 | | | | | | 28.7 |
| $CO_2$ | 52 | | | | | | 52 |
| KCl | | | 274 | 274 | | | |
| CuCl | | | 456 | 408 | | | |
| $CuCl_2$ | | | 181 | 229 | | | |
| $C_2H_6$ | | | | | 44 | 26.4 | |
| $C_2H_5Cl$ | | | | | 35 | 31.2 | |
| $C_2H_3Cl$ | | | | | | 3.5 | |
| $C_2H_4$ | | | | | | 14.9 | |
| $C_2H_4Cl_2$ | | | | | | 3 | |
| Total | 354.0 | 11.5 | 911 | 911 | 79 | 121.3 | 340.5 |

*Streams subjected to quenching.

Many modifications and variations of the invention are possible in the light of the above teachings. It is therefore to be understood, that within the scope of the appended claims, the invention may be practiced otherwise than as specifically described.

What is claimed is:

1. A process for separating chlorine values from a chlorinated hydrocarbon and employing said chlorine values for treating a feed containing a member selected from the group consisting of hydrocarbons, chlorinated hydrocarbons and mixtures thereof, comprising:
   (a) burning the chlorinated hydrocarbon to produce an effluent containing chlorine, hydrogen chloride, water, carbon dioxide, and nitrogen;
   (b) contacting the effluent with a melt containing cuprous chloride, cupric chloride and copper oxychloride, said contacting being effected at a temperature above 600° F. whereby the chlorine and hydrogen chloride are separated from the effluent by reaction with cuprous chloride and copper oxychloride, respectively, to produce cupric chloride; and (c) contacting the melt from step (b) with a feed a feed containing a member selected from the group consisting of hydrocarbons, chlorinated hydrocarbons and mixtures thereof, said contacting being effected at a temperature above 600° F. whereby chlorine is added to the feed and cupric chloride is converted to cuprous chloride.

2. A process for separating chlorine values from a chlorinated hydrocarbon and employing said separated chlorine values for treating a member selected from the group consisting of hydrocarbons, chlorinated hydrocarbons and mixtures thereof, comprising:
- (a) burning the chlorinated hydrocarbon at a temperature between about 1000° F. and about 3000° F., to produce a gaseous effluent containing chlorine, hydrogen chloride, water, carbon dioxide and nitrogen;
- (b) contacting the gaseous effluent and oxygen with a salt melt, containing cuprous and cupric chloride at a temperature between about 600° F. and about 1200° F., whereby the chlorine, oxygen and hydrogen chloride react with the melt to produce cupric chloride;
- (c) contacting the melt from step (b) with a feed containing a member selected from the group consisting of hydrocarbons, chlorinated hydrocarbons and mixtures thereof, said contacting being effected at a temperature above about 750° F., to effect reaction therebetween, resulting in reduction of cupric chloride to cuprous chloride and addition of chlorine to the feed; and
- (d) passing the melt from step (c) to step (b).

3. The process defined by claim 2 wherein the salt melt further contains an alkali metal chloride.

4. The process defined by claim 2 wherein the chlorinated hydrocarbon in step (a) is a member selected from the group consisting of 1,1-dichloroethylene, 1,2-dichloroethylenes, trichloroethylene, tetrachloroethylene, trichloroethane, and mixtures thereof.

5. The process defined by claim 4 wherein the feed of step (c) contains a member selected from the group consisting of ethylene and ethane.

6. The process defined by claim 4 wherein the feed of step (c) contains ethyl chloride and ethane.

References Cited

UNITED STATES PATENTS

| | | | |
|---|---|---|---|
| 2,113,028 | 4/1938 | Kuentzel | 252—415 |
| 2,407,828 | 9/1946 | Gorin | 260—659(XY) |
| 2,395,314 | 2/1946 | Blumer | 23—219 |
| 2,418,931 | 4/1947 | Gorin | 23—219 |
| 2,752,402 | 6/1956 | Pye | 23—97X |
| 3,276,842 | 10/1966 | Pfeiffer et al. | 23—219 |
| 3,346,339 | 10/1967 | Lyon | 23—216X |

LEON ZITVER, Primary Examiner

J. A. BOSKA, Assistant Examiner

U.S. Cl. X.R.

23—97, 154, 219